US012659914B2

(12) United States Patent
Barbu et al.

(10) Patent No.: US 12,659,914 B2
(45) Date of Patent: Jun. 16, 2026

(54) CONFIGURATION OF POSITION MEASUREMENT REPORTS

(71) Applicant: Nokia Technologies Oy, Espoo (FI)

(72) Inventors: Oana-Elena Barbu, Aalborg (DK); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 18/547,613

(22) PCT Filed: Apr. 26, 2022

(86) PCT No.: PCT/EP2022/060958
§ 371 (c)(1),
(2) Date: Aug. 23, 2023

(87) PCT Pub. No.: WO2022/233635
PCT Pub. Date: Nov. 10, 2022

(65) Prior Publication Data
US 2024/0236916 A1     Jul. 11, 2024

(30) Foreign Application Priority Data

May 4, 2021     (EP) ..................................... 21171912

(51) Int. Cl.
*H04W 64/00*          (2009.01)
*H04L 5/00*           (2006.01)
*H04W 28/02*          (2009.01)
(52) U.S. Cl.
CPC ........... *H04W 64/00* (2013.01); *H04L 5/0051* (2013.01); *H04W 28/0268* (2013.01)
(58) Field of Classification Search
CPC ........... H04W 52/0206; H04W 52/223; H04W 52/42; H04W 52/02; H04W 52/22;
(Continued)

(56) References Cited

U.S. PATENT DOCUMENTS

| 10,516,971 B2 | 12/2019 | Edge | |
| 12,302,440 B2 * | 5/2025 | Shrestha | ............... H04W 76/27 |

(Continued)

FOREIGN PATENT DOCUMENTS

| WO | 2020/167615 A1 | 8/2020 |
| WO | 2021/058328 A1 | 4/2021 |

OTHER PUBLICATIONS

Office action received for corresponding European Patent Application No. 21171912.5, dated Mar. 22, 2024, 6 pages.

(Continued)

*Primary Examiner* — Nathan S Taylor
(74) *Attorney, Agent, or Firm* — Harness, Dickey & Pierce, P.L.C.

(57)          ABSTRACT

Various example embodiments relate to configuration of positioning report message(s). An apparatus may transmit positioning assistance data to a device. The positioning assistance data may comprise at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device. The device may receive the positioning assistance data, perform at least one positioning measurement based on at least one positioning reference signal, and transmit positioning measurement data according to the positioning assistance data. Apparatuses, methods, and computer programs are disclosed.

13 Claims, 4 Drawing Sheets

(58) Field of Classification Search

CPC . H04W 52/00; H04W 28/0268; H04W 64/00; H04W 28/02; H04B 17/3913; H04B 7/061; H04B 7/0413; Y02D 30/70; G01S 5/0036; G01S 5/0236; G01S 5/00; H04L 5/0051; H04L 5/00

USPC .......................................................... 370/329

See application file for complete search history.

(56) References Cited

U.S. PATENT DOCUMENTS

| | | | | |
|---|---|---|---|---|
| 2019/0053010 | A1 | 2/2019 | Edge et al. | |
| 2019/0313437 | A1* | 10/2019 | Jung | H04L 5/0042 |
| 2021/0006372 | A1 | 1/2021 | Cha et al. | |
| 2021/0051622 | A1* | 2/2021 | Manolakos | H04W 64/00 |
| 2021/0051623 | A1* | 2/2021 | Manolakos | G01S 5/0236 |
| 2022/0046744 | A1* | 2/2022 | Bao | H04W 52/0235 |
| 2022/0338241 | A1* | 10/2022 | Chin | H04L 1/1812 |
| 2023/0127817 | A1* | 4/2023 | Lee | H04W 64/00 370/329 |
| 2023/0209555 | A1* | 6/2023 | Sosnin | H04L 5/0053 370/329 |
| 2024/0236916 | A1* | 7/2024 | Barbu | H04L 5/0051 |

OTHER PUBLICATIONS

Office action received for corresponding European Patent Application No. 21171912.5, dated Aug. 5, 2025, 8 pages.

"3rd Generation Partnership Project; Technical Specification Group Radio Access Network; LTE Positioning Protocol (LPP) (Release 16)", 3GPP TS 37.355 V16.3.0, Dec. 2020, pp. 1-298.

"Revised SID: Study on NR Positioning Enhancements", 3GPP TSG RAN Meeting #88e, RP-200928, Agenda: 9.1.1, CATT, Jun. 29-Jul. 3, 2020, 4 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

"Text proposal for TR38.857 on latency reduction results", 3GPP TSG-RAN WG2 Meeting #113-e, R2-2102095, Agenda: 8.11.2.1, Intel Corporation, Jan. 25-Feb. 5, 2021, pp. 1-27.

"Location Services Alternatives for 5G System Architecture and 5G Procedures", SA WG2 Meeting #118bis, S2-170310, Agenda: 6.5.8, Qualcomm Incorporated, Jan. 16-20, 2017, pp. 1-15.

"Discussion on Latency Aspects", 3GPP TSG-RAN WG2 #113e, R2-2101392, Agenda: 8.11.2.1, Ericsson, Jan. 25-Feb. 5, 2021, pp. 1-10.

"IEEE 802.11", Wikipedia, Retrieved on Sep. 1, 2023, Webpage available at : https://en.wikipedia.org/wiki/IEEE_802.11.

Extended European Search Report received for corresponding European Patent Application No. 21171912.5, dated Oct. 25, 2021, 7 pages.

"Summary of UE and gNB measurements for NR Positioning", 3GPP TSG RAN WG1 #98bis, R1-1910321, Agenda: 7.2.10.1, CATT, Oct. 14-18, 2019, 33 pages.

International Search Report and Written Opinion received for corresponding Patent Cooperation Treaty Application No. PCT/EP2022/060958, dated Jul. 28, 2022, 11 pages.

* cited by examiner

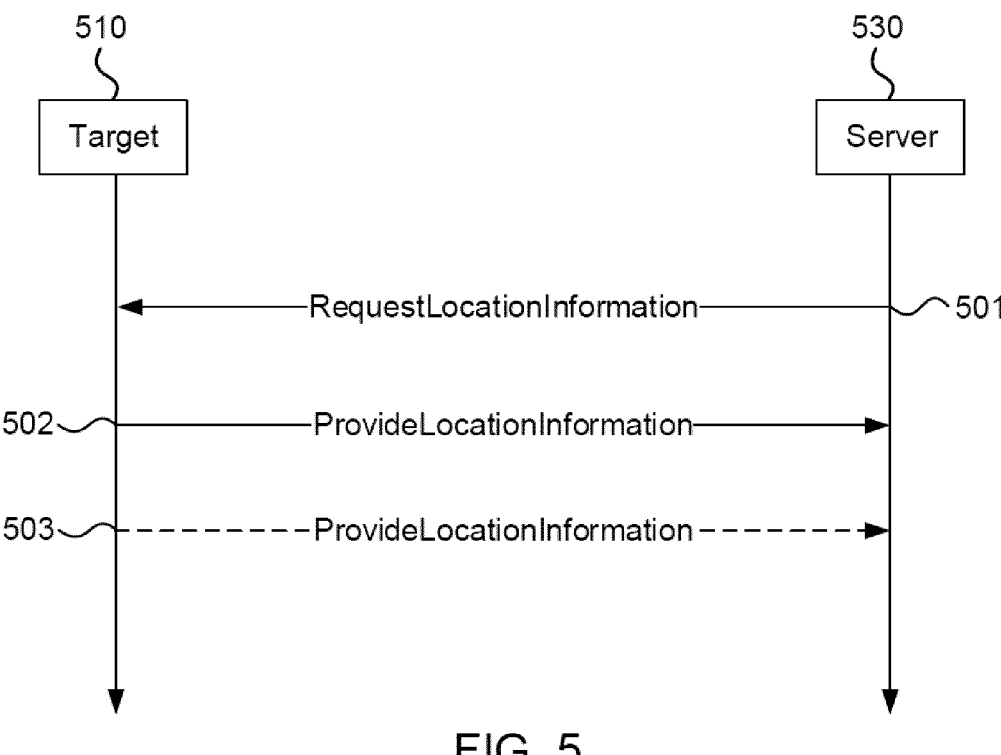

FIG. 5

601
Transmitting positioning assistance data, wherein the positioning assistance data comprises at least one of:
an indication of at least one minimum set of positioning measurement parameters to be reported in positioning measurement data by a device;
an indication of at least one minimum number of positioning measurements to be reported in the positioning measurement data by the device, or
an indication of at least one level of resolution for reporting the positioning measurement data by the device

FIG. 6

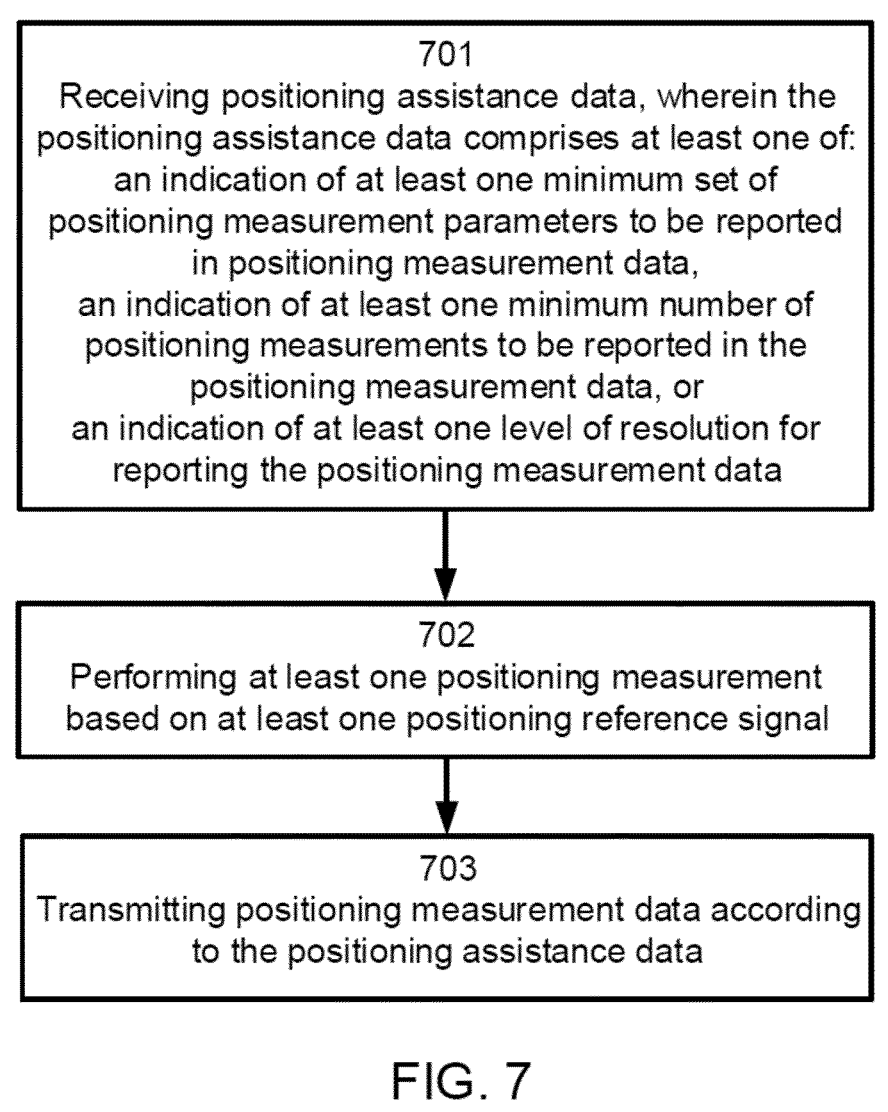

701
Receiving positioning assistance data, wherein the
positioning assistance data comprises at least one of:
an indication of at least one minimum set of
positioning measurement parameters to be reported
in positioning measurement data,
an indication of at least one minimum number of
positioning measurements to be reported in the
positioning measurement data, or
an indication of at least one level of resolution for
reporting the positioning measurement data 702
Performing at least one positioning measurement
based on at least one positioning reference signal 703
Transmitting positioning measurement data according
to the positioning assistance data

FIG. 7

CONFIGURATION OF POSITION MEASUREMENT REPORTS

RELATED APPLICATION

This application claims priority to PCT Application No. PCT/EP2022/060958, filed on Apr. 26, 2022, which claims priority from EP Application Serial No. 21171912.5, filed on May 4, 2021, each of which is incorporated herein by reference in its entirety.

TECHNICAL FIELD

Various example embodiments generally relate to the field of wireless communications. Some example embodiments relate to configuration of positioning report message(s) within a cellular communication network.

BACKGROUND

Various wireless communication systems, for example the 3GPP 5G New Radio (NR), may be configured to support positioning of devices. For example, a device may be configured to measure signals from multiple base stations and report these measurements to a location management function (LMF) of the network. Capabilities of such systems may be however further improved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. The scope of protection sought for various embodiments of the present disclosure is set out by the independent claims.

Example embodiments of the present disclosure enable a network to control multiple simultaneously applicable quality-of-service (QOS) requirements for reporting positioning measurement results. This and other benefits may be achieved by the features of the independent claims. Further advantageous implementation forms are provided in the dependent claims, the description, and the drawings.

According to a first aspect, an apparatus may comprise means for transmitting positioning assistance data, wherein the positioning assistance data comprises at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device.

According to an example embodiment of the first aspect, the apparatus may further comprise means for determining a plurality of positioning quality of service requirements for the device; and means for determining, based on the plurality of positioning quality of service requirements, at least one of: the at least one minimum set of positioning measurement parameters, the at least one minimum number of positioning measurements, or the at least one level of resolution.

According to an example embodiment of the first aspect, the apparatus may further comprise means for transmitting an indication of a priority order of the plurality of positioning quality-of-service requirements.

According to an example embodiment of the first aspect, the plurality of positioning quality-of-service requirements may comprise at least one latency requirement and at least one accuracy requirement for the positioning measurement data.

According to an example embodiment of the first aspect, the at least one minimum set of positioning measurement parameters may comprise at least one of: a time of arrival of at least one positioning reference signal, a time difference of arrival of at least one pair of positioning reference signals, an angle of arrival of the at least one positioning reference signal, a power level of the at least one positioning reference signal, or a power level of at least one multipath component of the at least one positioning reference signal.

According to an example embodiment of the first aspect, the indication of the at least one level of resolution may be associated with a first type of resolution control and indicative of at least one quantization level for at least one of the minimum set of positioning measurement parameters, or the indication of the at least one level of resolution may be associated with a second type of resolution control and indicative of a maximum amount of data for reporting a positioning measurement.

According to an example embodiment of the first aspect, the at least one level of resolution may comprise a plurality of quantization levels associated with a plurality of trust levels of the at least one positioning reference signal. The positioning assistance data may further comprise at least one criterion for determining a trust level of the at least one positioning reference signal.

According to an example embodiment of the first aspect, the at least one level of resolution may comprise a plurality of quantization levels associated with respective transmission-reception points, respective positioning measurement parameters, and/or respective carrier frequency ranges.

According to an example embodiment of the first aspect, the apparatus may further comprise means for transmitting a request for location information comprising: a minimum number of quantization bits for the at least one of the minimum set of positioning measurement parameters, or the plurality of quantization levels associated with the plurality of trust levels. The at least one criterion may comprise at least one threshold for a received signal strength or quality of the at least one positioning reference signal.

According to an example embodiment of the first aspect, the apparatus may further comprise means for receiving an acknowledgement to the request for location information. The acknowledgement may comprise an indication of whether the device supports the minimum number of quantization bits or an indication of a minimum and/or maximum number of quantization bits supported by the device.

According to an example embodiment of the first aspect, the acknowledgement may comprise an indication of one or more transmit-receive points associated with the acknowledgement.

According to an example embodiment of the first aspect, the apparatus may further comprise means for receiving an indication of one or more transmission-reception points detected by the device; and means for configuring at least one of the transmission-reception points detected by the device to transmit at least one on-demand positioning reference signal.

According to an example embodiment of the first aspect, the at least one number of positioning measurements may comprise at least one of: a number of transmission-reception points to be measured, a number of beamed channels per transmission-reception point to be measured, or a number of multipath channel components per beamed channel to be measured.

According to an example embodiment of the first aspect, the positioning assistance data may comprise a list of minimum sets of positioning measurement parameters associated with respective numbers of positioning measurements. The positioning assistance data may further comprise an indication of a priority order for the minimum sets of positioning measurement parameters of the list.

According to an example embodiment of the first aspect, the apparatus may further comprise means for receiving an indication of a minimum set of positioning measurement parameters and a respective number of positioning measurements selected from the list by the device.

According to an example embodiment of the first aspect, the apparatus may further comprise means for receiving an indication of whether the device supports reporting the positioning measurement data according to the first type of resolution control and/or the second type of resolution control.

According to an example embodiment of the first aspect, the apparatus may further comprise means for selecting a positioning algorithm based on the indication of the minimum set of positioning measurement parameters and the respective number of positioning measurements selected from the list or the indication of whether the device supports reporting the positioning measurement data according to the first type of resolution control and/or the second type of resolution control.

According to an example embodiment of the first aspect, the apparatus may further comprise means for receiving the positioning measurement data; and means for determining a position of the device based on the positioning measurement data.

According to a second aspect, a method may comprise: transmitting positioning assistance data, wherein the positioning assistance data comprises at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device.

According to an example embodiment of the second aspect, the method may further comprise determining a plurality of positioning quality of service requirements for the device; and determining, based on the plurality of positioning quality of service requirements, at least one of: the at least one minimum set of positioning measurement parameters, the at least one minimum number of positioning measurements, or the at least one level of resolution.

According to an example embodiment of the second aspect, the method may further comprise transmitting an indication of a priority order of the plurality of positioning quality-of-service requirements.

According to an example embodiment of the second aspect, the plurality of positioning quality-of-service requirements may comprise at least one latency requirement and at least one accuracy requirement for the positioning measurement data.

According to an example embodiment of the second aspect, the at least one minimum set of positioning measurement parameters may comprise at least one of: a time of arrival of at least one positioning reference signal, a time difference of arrival of at least one pair of positioning reference signals, an angle of arrival of the at least one positioning reference signal, a power level of the at least one positioning reference signal, or a power level of at least one multipath component of the at least one positioning reference signal.

According to an example embodiment of the second aspect, the indication of the at least one level of resolution may be associated with a first type of resolution control and indicative of at least one quantization level for at least one of the minimum set of positioning measurement parameters, or the indication of the at least one level of resolution may be associated with a second type of resolution control and indicative of a maximum amount of data for reporting a positioning measurement.

According to an example embodiment of the second aspect, the at least one level of resolution may comprise a plurality of quantization levels associated with a plurality of trust levels of the at least one positioning reference signal. The positioning assistance data may further comprise at least one criterion for determining a trust level of the at least one positioning reference signal.

According to an example embodiment of the second aspect, the at least one level of resolution may comprise a plurality of quantization levels associated with respective transmission-reception points, respective positioning measurement parameters, and/or respective carrier frequency ranges.

According to an example embodiment of the second aspect, the method may further comprise transmitting a request for location information comprising: a minimum number of quantization bits for the at least one of the minimum set of positioning measurement parameters, or the plurality of quantization levels associated with the plurality of trust levels. The at least one criterion may comprise at least one threshold for a received signal strength or quality of the at least one positioning reference signal.

According to an example embodiment of the second aspect, the method may further comprise receiving an acknowledgement to the request for location information. The acknowledgement may comprise an indication of whether the device supports the minimum number of quantization bits or an indication of a minimum and/or maximum number of quantization bits supported by the device.

According to an example embodiment of the second aspect, the acknowledgement may comprise an indication of one or more transmit-receive points associated with the acknowledgement.

According to an example embodiment of the second aspect, the method may further comprise receiving an indication of one or more transmission-reception points detected by the device; and configuring at least one of the transmission-reception points detected by the device to transmit at least one on-demand positioning reference signal.

According to an example embodiment of the second aspect, the at least one number of positioning measurements may comprise at least one of: a number of transmission-reception points to be measured, a number of beamed channels per transmission-reception point to be measured, or a number of multipath channel components per beamed channel to be measured.

According to an example embodiment of the second aspect, the positioning assistance data may comprise a list of minimum sets of positioning measurement parameters associated with respective numbers of positioning measurements. The positioning assistance data may further comprise an indication of a priority order for the minimum sets of positioning measurement parameters of the list.

According to an example embodiment of the second aspect, the method may further comprise receiving an indication of a minimum set of positioning measurement parameters and a respective number of positioning measurements selected from the list by the device.

According to an example embodiment of the second aspect, the method may further comprise receiving an indication of whether the device supports reporting the positioning measurement data according to the first type of resolution control and/or the second type of resolution control.

According to an example embodiment of the second aspect, the method may further comprise selecting a positioning algorithm based on the indication of the minimum set of positioning measurement parameters and the respective number of positioning measurements selected from the list or the indication of whether the device supports reporting the positioning measurement data according to the first type of resolution control and/or the second type of resolution control.

According to an example embodiment of the second aspect, the method may further comprise receiving the positioning measurement data; and determining a position of the device based on the positioning measurement data.

According to a third aspect, a computer program may comprise instructions for causing an apparatus to perform at least the following: transmitting positioning assistance data, wherein the positioning assistance data comprises at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device. The computer program may further comprise instructions for causing the apparatus to perform any example embodiment of the method of the second aspect.

According to a fourth aspect, an apparatus may comprise at least one processor and at least one memory including computer program code, the at least one memory and the computer code configured to, with the at least one processor, cause the apparatus at least to: transmit positioning assistance data, wherein the positioning assistance data comprises at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device. The computer code may be further configured to cause the apparatus to perform any example embodiment of the method of the second aspect.

According to a fifth aspect, an apparatus may comprise means for receiving positioning assistance data, wherein the positioning assistance data comprises at least one of: an indication of at least one minimum set of positioning measurement parameters to be reported in positioning measurement data, an indication of at least one minimum number of positioning measurements to be reported in the positioning measurement data, or an indication of at least one level of resolution for reporting the positioning measurement data; means for performing at least one positioning measurement based on at least one positioning reference signal; and means for transmitting positioning measurement data according to the positioning assistance data.

According to an example embodiment of the fifth aspect, the apparatus may further comprise means for receiving an indication of a priority order of a plurality of positioning quality-of-service requirements; and means for transmitting the positioning measurement data according to the priority order of the plurality of positioning quality-of-service requirements.

According to an example embodiment of the fifth aspect, the plurality of positioning quality-of-service requirements may comprise at least one latency requirement and at least one accuracy requirement for the positioning measurement data.

According to an example embodiment of the fifth aspect, the at least one minimum set of positioning measurement parameters may comprise at least one of: a time of arrival of at least one positioning reference signal, a time difference of arrival of at least one pair of positioning reference signals, an angle of arrival of the at least one positioning reference signal, a power level of the at least one positioning reference signal, or a power level of at least one multipath component of the at least one positioning reference signal.

According to an example embodiment of the fifth aspect, the indication of the at least one level of resolution may be associated with a first type of resolution control and indicative of at least one quantization level for at least one of the minimum set of positioning measurement parameters, or the indication of the at least one level of resolution may be associated with a second type of resolution control and indicative of a maximum amount of data for reporting a positioning measurement.

According to an example embodiment of the fifth aspect, the at least one level of resolution may comprise a plurality of quantization levels associated with a plurality of trust levels of the at least one positioning reference signal. The positioning assistance data may further comprise at least one criterion for determining a trust level of the at least one positioning reference signal. The apparatus may further comprise: means for determining the trust level of the at least one positioning reference signal based on the at least one criterion; and means for determining a quantization level for the at least one of the minimum set of positioning measurement parameters based on the determined trust level.

According to an example embodiment of the fifth aspect, the at least one level of resolution may comprise a plurality of quantization levels associated with respective transmission-reception points, respective positioning measurement parameters, and/or respective carrier frequency ranges. The apparatus may further comprise: means for determining a quantization level for the at least one of the minimum set of positioning measurement parameters based on an identity of a transmission-reception point from which the at least one positioning reference signal is received, a positioning measurement parameter to be reported, or a carrier frequency of the positioning reference signal.

According to an example embodiment of the fifth aspect, the apparatus may further comprise means for receiving a request for location information comprising: a minimum number of quantization bits for the at least one of the minimum set of positioning measurement parameters, or the plurality of quantization levels associated with the plurality of trust levels. The at least one criterion may comprise at least one threshold for a received signal strength or quality of the at least one positioning reference signal.

According to an example embodiment of the fifth aspect, the apparatus may further comprise means for transmitting an acknowledgement to the request for location information. The acknowledgement may comprise an indication of whether the apparatus supports the minimum number of quantization bits or an indication of a minimum and/or maximum number of quantization bits supported by the apparatus.

According to an example embodiment of the fifth aspect, the acknowledgement may comprise an indication of one or more transmit-receive points associated with the acknowledgement.

According to an example embodiment of the fifth aspect, the apparatus may further comprise means for transmitting an indication of one or more transmission-reception points detected by the apparatus.

According to an example embodiment of the fifth aspect, the at least one number of positioning measurements may comprise at least one of: a number of transmission-reception points to be measured, a number of beamed channels per transmission-reception point to be measured, or a number of multipath channel components per beam to be measured.

According to an example embodiment of the fifth aspect, the positioning assistance data may comprise a list of minimum sets of positioning measurement parameters associated with respective numbers of positioning measurements. The positioning assistance data may further comprise an indication of a priority order for the minimum sets of positioning measurement parameters of the list. The apparatus may further comprise: means for selecting a minimum set of positioning measurement parameters and a respective number of positioning measurements from the list.

According to an example embodiment of the fifth aspect, the apparatus may further comprise means for transmitting an indication of the minimum set of positioning measurement parameters and the respective number of positioning measurements selected from the list.

According to an example embodiment of the fifth aspect, the apparatus may further comprise means for transmitting an indication of whether the apparatus supports reporting the positioning measurement data according to the first type of resolution control and/or the second type of resolution control.

According to a sixth aspect, a method may comprise: receiving positioning assistance data, wherein the positioning assistance data comprises at least one of: an indication of at least one minimum set of positioning measurement parameters to be reported in positioning measurement data, an indication of at least one minimum number of positioning measurements to be reported in the positioning measurement data, or an indication of at least one level of resolution for reporting the positioning measurement data; performing at least one positioning measurement based on at least one positioning reference signal; and transmitting positioning measurement data according to the positioning assistance data. The method may be performed by a device.

According to an example embodiment of the sixth aspect, the method may further comprise: receiving an indication of a priority order of a plurality of positioning quality-of-service requirements; and transmitting the positioning measurement data according to the priority order of the plurality of positioning quality-of-service requirements.

According to an example embodiment of the sixth aspect, the plurality of positioning quality-of-service requirements may comprise at least one latency requirement and at least one accuracy requirement for the positioning measurement data.

According to an example embodiment of the sixth aspect, the at least one minimum set of positioning measurement parameters may comprise at least one of: a time of arrival of at least one positioning reference signal, a time difference of arrival of at least one pair of positioning reference signals, an angle of arrival of the at least one positioning reference signal, a power level of the at least one positioning reference signal, or a power level of at least one multipath component of the at least one positioning reference signal.

According to an example embodiment of the sixth aspect, the indication of the at least one level of resolution may be associated with a first type of resolution control and indicative of at least one quantization level for at least one of the minimum set of positioning measurement parameters, or the indication of the at least one level of resolution may be associated with a second type of resolution control and indicative of a maximum amount of data for reporting a positioning measurement.

According to an example embodiment of the sixth aspect, the at least one level of resolution may comprise a plurality of quantization levels associated with a plurality of trust levels of the at least one positioning reference signal. The positioning assistance data may further comprise at least one criterion for determining a trust level of the at least one positioning reference signal. The method may further comprise: determining the trust level of the at least one positioning reference signal based on the at least one criterion; and determining a quantization level for the at least one of the minimum set of positioning measurement parameters based on the determined trust level.

According to an example embodiment of the sixth aspect, the at least one level of resolution may comprise a plurality of quantization levels associated with respective transmission-reception points, respective positioning measurement parameters, and/or respective carrier frequency ranges. The method may further comprise: determining a quantization level for the at least one of the minimum set of positioning measurement parameters based on an identity of a transmission-reception point from which the at least one positioning reference signal is received, a positioning measurement parameter to be reported, or a carrier frequency of the positioning reference signal.

According to an example embodiment of the sixth aspect, the method may further comprise receiving a request for location information comprising: a minimum number of quantization bits for the at least one of the minimum set of positioning measurement parameters, or the plurality of quantization levels associated with the plurality of trust levels. The at least one criterion may comprise at least one threshold for a received signal strength or quality of the at least one positioning reference signal.

According to an example embodiment of the sixth aspect, the method may further comprise transmitting an acknowledgement to the request for location information. The acknowledgement may comprise an indication of whether the device supports the minimum number of quantization bits or an indication of a minimum and/or maximum number of quantization bits supported by the device.

According to an example embodiment of the sixth aspect, the acknowledgement may comprise an indication of one or more transmit-receive points associated with the acknowledgement.

According to an example embodiment of the sixth aspect, the method may further comprise transmitting an indication of one or more transmission-reception points detected by the device.

According to an example embodiment of the sixth aspect, the at least one number of positioning measurements may comprise at least one of: a number of transmission-reception points to be measured, a number of beamed channels per transmission-reception point to be measured, or a number of multipath channel components per beam to be measured.

According to an example embodiment of the sixth aspect, the positioning assistance data may comprise a list of minimum sets of positioning measurement parameters associated with respective numbers of positioning measurements. The positioning assistance data may further comprise an indication of a priority order for the minimum sets of positioning measurement parameters of the list. The method may further comprise: selecting a minimum set of positioning measurement parameters and a respective number of positioning measurements from the list.

According to an example embodiment of the sixth aspect, the method may further comprise transmitting an indication of the minimum set of positioning measurement parameters and the respective number of positioning measurements selected from the list.

According to an example embodiment of the sixth aspect, the method may further comprise transmitting an indication of whether the device supports reporting the positioning measurement data according to the first type of resolution control and/or the second type of resolution control.

According to a seventh aspect, a computer program may comprise instructions for causing an apparatus to perform at least the following: receiving positioning assistance data, wherein the positioning assistance data comprises at least one of: an indication of at least one minimum set of positioning measurement parameters to be reported in positioning measurement data, an indication of at least one minimum number of positioning measurements to be reported in the positioning measurement data, or an indication of at least one level of resolution for reporting the positioning measurement data; performing at least one positioning measurement based on at least one positioning reference signal; and transmitting positioning measurement data according to the positioning assistance data. The computer program may further comprise instructions for causing the apparatus to perform any example embodiment of the method of the sixth aspect.

According to an eighth aspect, an apparatus may comprise at least one processor and at least one memory including computer program code, the at least one memory and the computer code configured to, with the at least one processor, cause the apparatus at least to: receive positioning assistance data, wherein the positioning assistance data comprises at least one of: an indication of at least one minimum set of positioning measurement parameters to be reported in positioning measurement data, an indication of at least one minimum number of positioning measurements to be reported in the positioning measurement data, or an indication of at least one level of resolution for reporting the positioning measurement data; perform at least one positioning measurement based on at least one positioning reference signal; and transmit positioning measurement data according to the positioning assistance data. The computer code may be further configured to cause the apparatus to perform any example embodiment of the method of the sixth aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments.

In the drawings:

FIG. 5 illustrates an example of communication between a server and a target device according to an enhanced positioning protocol, according to an example embodiment;

FIG. 6 illustrates an example of a method for requesting positioning measurement(s), according to an example embodiment; and FIG. 7 illustrates an example of providing positioning measurement(s) data, according to an example embodiment.

Like references are used to designate like parts in the accompanying drawings.

DETAILED DESCRIPTION

Figure 1:
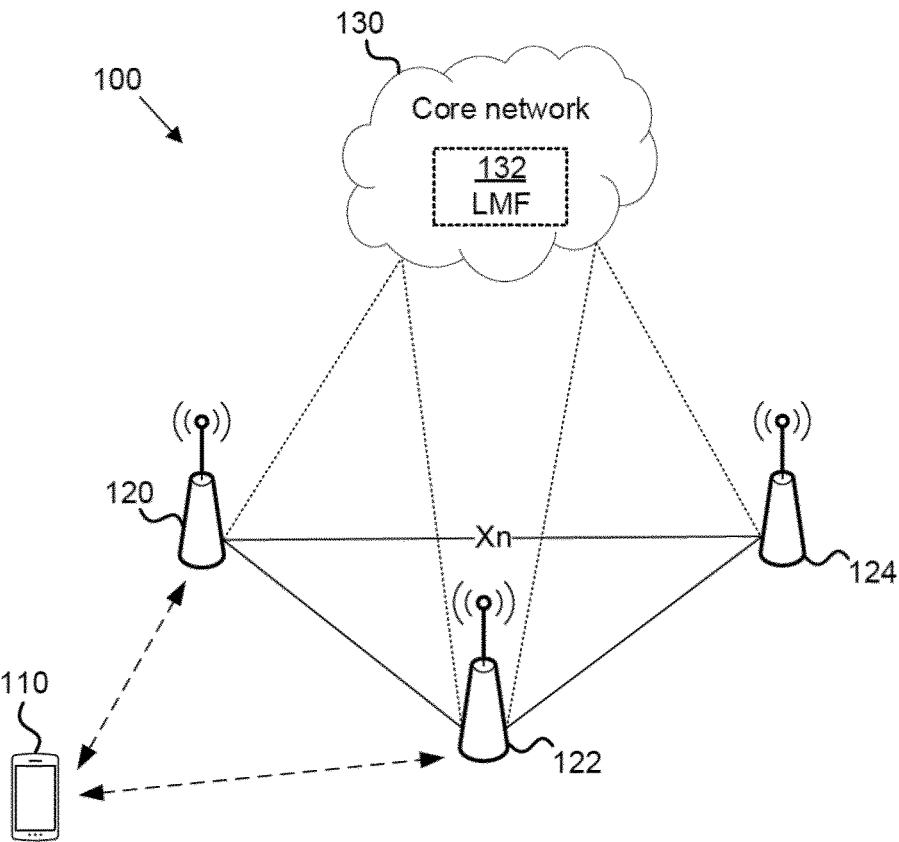
FIG. 1 illustrates an example of a communication network, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Devices, such as for example user equipment (UE), may be enabled to access mobile services through a radio access network (RAN). The radio access network may be however exploited also for determining the current location of the device. In some applications, such as for example industrial internet-of-thing (IIoT) and extended reality (XR), positioning may need to be performed with both low latency and high accuracy. It may be therefore desired to develop enhancements and solutions that enable not only to support high positioning accuracy (both horizontal and vertical), but also low latency and high network efficiency, for example in terms of scalability and reference signal (RS) overhead. Furthermore, power consumption and complexity requirements may be important for some commercial use cases. And, to enable rapid deployment, it may be desired to develop enhanced solutions that do not cause major modifications to existing systems.

As an example of positioning accuracy requirements, for general commercial use cases the system may be desired to achieve sub-meter (less than 1 m) accuracy. For IIoT use cases, the desired positioning accuracy may be even lower, for example less than 0.2 m. At the same time, a target latency may be in the order of 10-100 ms. For emerging applications that rely on high-precision positioning, for example autonomous applications (e.g. in automotive use cases), it may be desired to achieve both high integrity and high reliability in addition to high accuracy. Integrity is a measure of trust on the correctness of information provided by a positioning system. Integrity may include the ability of a system to identify failures and provide timely warnings accordingly. It may be therefore also desired to enable determining the reliability and the uncertainty (confidence level) of positioning data.

To support the positioning requirements for emerging applications, the example embodiments of the present disclosure provide methods for optimizing communication between a UE and the network (e.g. LMF) at least in terms of latency and positioning accuracy.

According to an example embodiment, an apparatus, for example a network node implementing the LMF, may transmit positioning assistance data to a device, for example a UE. The positioning assistance data may comprise at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device. The device may receive the positioning assistance data, perform at least one positioning measurement based on at least one positioning reference signal, and transmit positioning measurement data according to the positioning assistance data. This enables the network to control reporting of positioning measurements such that desired QoS requirements are met.

FIG. 1 illustrates an example of a communication network 100, according to an example embodiment. The communication network 100 may comprise one or more transmitters, represented in this example by transmit-receive points (TRPs) 120, 122, 124. The TRPs may be for example base stations. TRPs may transmit signals to a device. Such device may be also referred to as a user node or user equipment (UE). The UE 110 may comprise for example a mobile phone, a vehicle, or any other device capable of communicating with the base stations. The signals provided by the TRPs to the UE 110 may comprise reference signals such as for example positioning reference signals (PRSs). A positioning reference signal may comprise any suitable signal that enables the UE 110 to determine its position, or another device to determine the position of the UE 110 based on measurements of the PRSs reported by the UE 110. PRSs may be for example broadcast by the TRPs. Determining the position of the UE 110 may be for example based on detected times-of-arrival (TOA) of PRSs received from multiple TRPs. Even though FIG. 1 illustrates the UE 110 to communicate with two TRPs, the UE 110 may in practice receive PRSs from more than two TRPs. Furthermore, the UE 110 may receive TRPs from multiple beamed channels of one TRP. Reporting the positioning measurements may therefore consume a considerable amount of transmission capacity. Intolerable delay may be also introduced in some applications.

The TRPs 120, 122, 124 may be configured to communicate with a core network 130 over a communication interface, such as for example a control plane interface or a user plane interface NG-C/U as defined by 3GPP (3rd generation partnership project) standards. The base stations may be also called radio access network (RAN) nodes and they may be part of a radio access network between the core network 130 and the UE 110. The core network 130 may comprise at least one location management function (LMF) 132. An LMF 132 may be configured to determine, for example based on positioning measurement information received from the UE 110, a current location of the UE 110. Network elements such as the LMF 132 or the TRPs 120, 122, 124 may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

Example embodiments of the present disclosure may be applied in context of a positioning protocol, for example the 3GPP Long-Term Evolution (LTE) positioning protocol (LPP). A location information transfer procedure may comprise the following steps:

1) A server (e.g. a positioning server such as the LMF 132), may send a RequestLocationInformation message to a target to request location information. The RequestLocationInformation message may comprise an indication of a type of location information requested. The RequestLocationInformation message may further comprise an indication of quality-of-service (QOS) associated with the request. The RequestLocationInformation message may also comprise other signaling information, such as for example positioning assistance data, as will be further described below.

2) The target (e.g. UE 110) may send a ProvideLocationInformation message to the server to transfer location information. The location information transferred may match or be a subset of the location information requested by the server, unless the server explicitly allows additional location information. If Step 3 does not occur, an endTransaction information element of this message may be set to a boolean value TRUE. The ProvideLocationInformation message may be further configured to include an acknowledgement or other information associated with the positioning assistance data.

3) If requested in Step 1, the target may send additional ProvideLocationInformation messages to the server to transfer location information. The location information transferred may match or be a subset of the location information requested in Step 1 unless the server explicitly allows additional location information. The endTransaction information element of the last message may be set to a boolean value TRUE.

Reporting of location information by the target may be configured with certain restrictions in order to manage data traffic in the communication network 100. A target may be configured to split a positioning report message, such as for example an OTDOA (observed time different of arrival) message, into several messages to be transmitted sequentially. The target may be for example configured to divide the positioning measurement results into multiple ProvideLocationInformation messages, in response to determining that the number of measurement elements (which may be associated with neighboring base stations or TRPs) exceeds a threshold. The server may for example send to the target an indication of a message size limit for positioning report messages, for example within a signaling field message SizeLimitNB. This message size limit may indicate a limit on the amount of location information a target device can return in one message. The limit may be for example expressed in octets. The messageSizeLimitNB may for example comprise a signaling field measurementLimit that indicates the maximum amount of location information the target device should return in response to a RequestLocationInformation message received from the server. The limit may apply to the overall size of the LPP message (LPP Provide Location Information) at the LPP level. The field measurementhimit may be specified for example in steps of 100 octets. The message size limit may be then determined by multiplying the value provided in measurementLimit by 100 octets.

The restrictions on the message size may prevent latency requirements of some applications from being met. For example, some ProvidelocationInformation messages may be too long to fit in the specified space (e.g. 100 octets). Lacking any network assistance, the UE 110 may not consider the QoS requirements and create unacceptable latency or alternatively, quantize the report to a shorter representation, reducing the overall localization accuracy Therefore, example embodiments of the present disclosure provide a joint approach for dealing with multiple QoS requirements, for example accuracy and latency, taking also into account possible restrictions on the message size. For example, methods for enabling the LMF 132 to instruct the UE 110 on how to deal with large messages as part of the ProvideLocationInformation response are disclosed.

Figure 2:
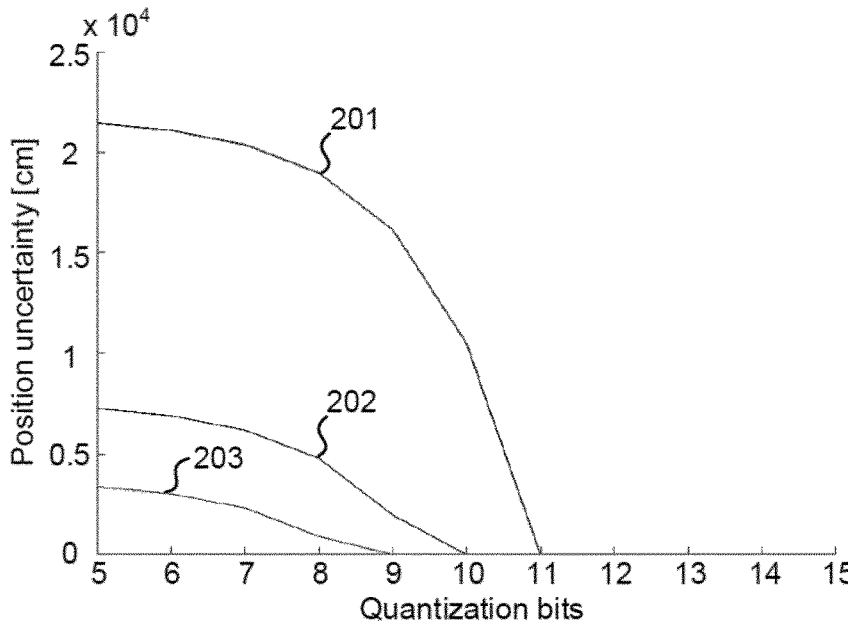
FIG. 2 illustrates an example of positioning uncertainty with respect to number of quantization bits, according to an example embodiment.

FIG. 2 illustrates an example of positioning uncertainty with respect to number of quantization bits, according to an example embodiment. Curves 201, 202, and 203 illustrate the positioning uncertainty with respect to the number of quantization bits for different times of arrival $T=123T_C$, $T=43T_C$, and $T=21T_C$, respectively, where $T_C$ is a timing unit of 5G NR specifications. The quantization (compression) loss increases as the number of quantization bits decreases. In future applications an LPP report may include metrics associated with more than one multipath component (channel tap). The number of multipath components may be indicated to the UE 110 by the LMF 132. Furthermore, this type of positioning measurements may be performed for each PRS beam and therefore, for example in frequency range 2 (26.50-28.35 GHZ) and above, the UE 110 may be configured to report one positioning measurement for each multipath component, for each beamed channel, and for each TRP. Measurement of a multipath component may include measurements of peak times, peak power levels, or downlink angle of arrival (AoA) for the multipath components.

For example, the UE 110 may be configured by the LMF 132 to measure T=10 TRPs. Each TRP may transmit P=8 beamed PRSs. For each of the P×T channels, the UE 110 may be configured to report N=4 positioning measurements associated with the strongest N multipath components. This means the UE 110 may need to report P×T×N=320 positioning measurements for one LPP session. One positioning measurement may for example comprise a) an indication of time of arrival, b) an indication of angle of arrival, and c) an indication of power level. Assuming that each of the measurements a) to c) occupies 11 bits—for example to ensure sufficient accuracy as show in FIG. 2, one positioning measurement report may be approximated to have a total payload of $size_{PM}=33$ bits. In that case, the size of the total LPP report becomes $size_{LPP}=P×T×N×size_{PM}=10560$ bit=1320 B (bytes). If each positioning report message is required not to be larger than s=100 B, the UE 110 may need to split the positioning report into $$K = \left\lceil \frac{size_{LPP}}{s} \right\rceil = 14$$

messages.

Assuming a latency of 40 ms per message, in this example the total latency associated with the LPP report becomes L=560 ms. If the target latency is for example 100 ms, the resulting latency is clearly not acceptable. If no framework is provided for the LMF 132 to mitigate the above issue, the localization of the UE 110 may be compromised. Furthermore, many applications such as XR or IIOT may be both accuracy and latency sensitive. Therefore, it may be desired to properly manage the tradeoff between latency and accuracy by the LMF 132. The LMF 132 may be for example configured to instruct the UE 110 on how to perform the transmission of the positioning report such that the application-dependent requirements are met. The example embodiments of the present disclosure enable the LMF 132 to instruct UE 110 how to handle both latency and accuracy sensitive positioning reports in presence of requirements to the message size.

Figure 3:
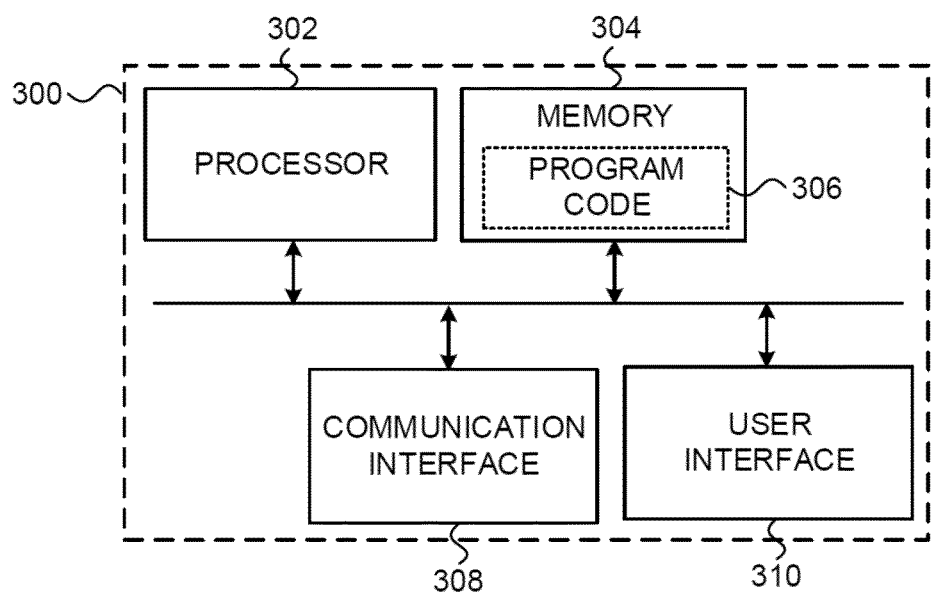
FIG. 3 illustrates an example of an apparatus configured to practice one or more example embodiments.

FIG. 3 illustrates an example embodiment of an apparatus 300, for example a computing device such as UE 110, any of the TRPs 120, 122, 124, or a device implementing the LMF 132. The apparatus 300 may comprise at least one processor 302. The at least one processor 302 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware (HW) accelerator, a special-purpose computer chip, or the like.

The apparatus 300 may further comprise at least one memory 304. The at least one memory 304 may be configured to store, for example, computer program code or the like, for example operating system software and application software. The at least one memory 304 may comprise one or more volatile memory devices, one or more non-volatile memory devices, and/or a combination thereof. For example, the at least one memory 304 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 300 may further comprise a communication interface 308 configured to enable apparatus 300 to transmit and/or receive information to/from other devices. In one example, apparatus 300 may use communication interface 308 to transmit and/or receive signals, for example PRSs. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 308 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 300 may further comprise a user interface 310 comprising an input device and/or an output device. The input device may take various forms such a keyboard, a touch screen, or one or more embedded control buttons. The output device may for example comprise a display, a speaker, a vibration motor, or the like.

When the apparatus 300 is configured to implement some functionality, some component and/or components of the apparatus 300, such as for example the at least one processor 302 and/or the at least one memory 304, may be configured to implement this functionality. Furthermore, when the at least one processor 302 is configured to implement some functionality, this functionality may be implemented using the program code 306 comprised, for example, in the at least one memory 304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 300 comprises means for performing at least one example embodiment described herein. In one example, the means comprises the at least one processor 302, the at least one memory 304 including program code 306 configured to, when executed by the at least one processor, cause the apparatus 300 to perform the example embodiment(s).

The apparatus 300 may comprise for example a computing device such as for example a base station, a server, a positioning server, a network device, a mobile phone, a tablet computer, a laptop, an internet of things (IOT) device, or the like. Examples of IoT devices include, but are not limited to, consumer electronics, wearables, sensors, and smart home appliances. In one example, the apparatus 300 may comprise a vehicle such as for example a car. Although apparatus 300 is illustrated as a single device it is appreciated that, wherever applicable, functions of the apparatus 300 may be distributed to a plurality of devices, for example to implement example embodiments as a cloud computing service.

Figure 4:
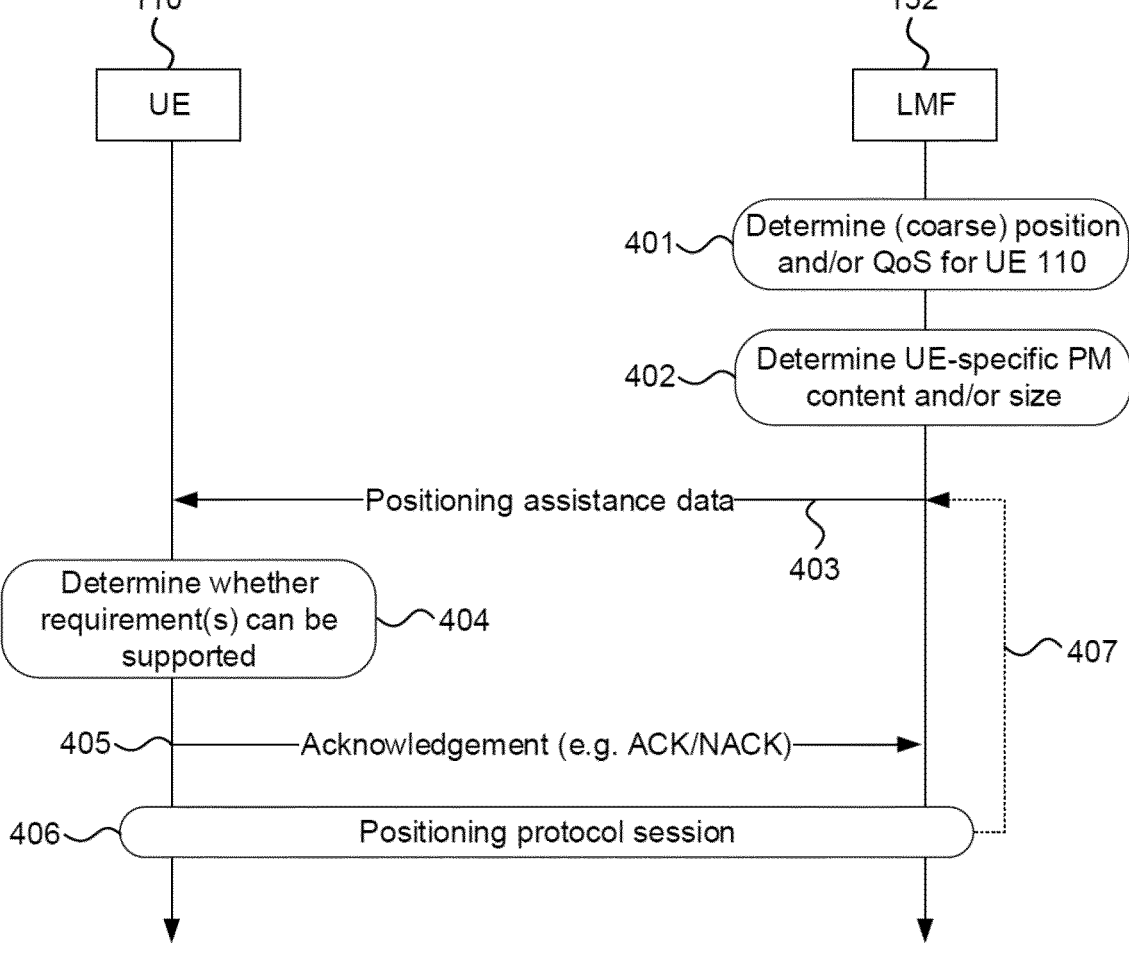
FIG. 4 illustrates an example of operations according to an enhanced positioning protocol at a user equipment (UE) and a location management function (LMF), according to an example embodiment.

FIG. 4 illustrates an example of operations according to an enhanced positioning protocol at a user equipment and a location management function, according to an example embodiment. The UE 110 is provided as an example of a device, which may be also referred to as a target or a target device. The LMF 132 is provided as an example of a network node or network function. It is however appreciated that the described operations may be performed with any suitable type of devices, network nodes, or network functions.

At operation 401, the LMF 132 may determine a position of the UE 110. The location of the UE 110 may be determined for example based on, or at the level of, a cell identifier of the serving cell and/or a beam identifier of the serving beam. The determined location may therefore comprise a coarse location or an initial location, which may be in contrast to a more accurate location to be determined based on positioning reference signals received by the UE 110. The LMF 132 may further determine positioning QoS requirements for the UE 110. The positioning QoS requirements may be specific for the UE 110. The LMF 132 may therefore determine different positioning QoS requirements for different UEs. The positioning Qos requirements may comprise a latency requirement and/or an accuracy requirement for positioning measurement data to be reported by the UE 110 to the LMF 132. The latency requirement may comprise an upper bound for acceptable latency for the UE 110, for example 100 ms. The accuracy requirement may comprise an upper bound for an acceptable uncertainty range of positioning, for example 0.2 m. The LMF 132 may determine multiple positioning QoS requirements, for example latencies and/or accuracies, which may be associated with different conditions or parameters of the communication network 100. For example, different positioning QoS requirements may be determined for different frequency ranges, geographical areas, cells, applications, or the like.

At operation 402, the LMF 132 may determine UE-specific positioning measurement (PM) content and/or size for the UE 110. The PM content may include the channel metrics that the UE 110 is requested to measure. The PM content and/or PM size are provided as examples of positioning assistance data, which the LMF 132 may determine in order to control reporting of positioning measurement data by the UE 110. Another example of positioning assistance data is the level resolution of the PM(s) to be reported by the UE 110. The UE-specific PM content, PM size, or PM resolution may be determined based on the positioning QoS requirements and/or the (coarse) location determined at operation 401. For example, if the accuracy requirement is in the order of tens of meters, the UE 110 may use the minimum number of bits (e.g. 5 bits in FIG. 2), which may correspond the coarsest PM resolution and smallest PM size. The accuracy requirement may be determined based on type(s) of function(s) for which the position estimate of the UE 110 is provided. For example, for a radio resource management (RRM) function the accuracy requirement may be in the mentioned order of tens of meters, but the accuracy requirement may be different for other functions. Furthermore, different locations (e.g. cells or geographical areas) may be configured with different QoS requirements and therefore the LMF 132 may determine the QoS requirements also based on the location of the UE 110 determined at operation 401.

The PM content may include a minimum set of PM parameters to be reported by the UE 110. The minimum set of parameters may for example include one or more of: a time of arrival (TOA), a time difference of arrival (TDOA), an angle of arrival (AOA), a power level, or a power level of at least one multipath component of at least one PRS. The minimum set of PM parameters may include the parameters that the UE 110 is requested to report at least, for example to enable the LMF 132 to determine the location of the UE 110 with sufficient QoS, e.g. accuracy and latency. The UE 110 may be however allowed to report more PM parameters than indicated by the minimum set of PM parameters. The minimum set of PM parameters may comprise a reduced set of PM parameters compared to another set of PM parameters targeted for a higher QoS. The positioning assistance data may comprise an indication of the PM content.

The PM size may refer to the number of positioning measurements that the UE 110 is requested to report. The PM size may be for example equal to the product of the number of TRPs, the number of beamed channels per TRP, and the number of multipath components per beam to be measured. The number of beamed channels may be for example equal the number of TX beams or the number of TX-RX beam pairs to be measured. In general, a beamed channel may comprise transmission resources allocated for a beamformed transmission. The positioning assistance data may therefore also include an indication of the PM size, for example a minimum number of PMs to be reported by the UE 110.

The PM resolution may comprise a level of resolution for reporting the PM data. The positioning assistance data may comprise an indication of the PM resolution. In addition to the above mentioned PM parameters, the PM resolution may be provided for observed time difference of arrival (OTDOA), reference signal received power (RSRP), round-trip time (RTT), reference signal time difference (RSTD), or Rx-Tx time difference. One or more of these PM parameters may be also included in the minimum set of PM parameters to be reported by the UE 110.

According to a first type of resolution control, the level of resolution may comprise quantization level(s) for the minimum set of PM parameters. The quantization level(s) may be for example include a minimum and/or maximum number of bits per PM metric, for example a minimum number of bits for TOA (min bits per TOA), a minimum number of bits for AOA (min bits per AOA), a maximum number of bits for TOA (max bits per TOA), and/or a maximum number of bits for AOA (max bits per AOA). According to a second type of resolution control, the level of resolution may be indicated as a maximum amount of data, for example a maximum number of bits, for reporting a PM. In this case, the UE 110 may decide how to quantize the reported PM metrics to ensure that this resolution requirement is met. The positioning assistance data may comprise an indication of whether the level(s) of resolution are associated with the first type or second type of resolution control. This enables the UE 110 to interpret the indication of the level(s) of resolution.

The positioning assistance data may alternatively include an indication of multiple quantization levels. The different quantization levels may be associated with different conditions, for example with different trust levels of the received PRS(s). The UE 110 may determine a trust level of a PRS based on at least one predetermined or configured criterion for the received PRS. The at least one criterion may comprise threshold(s) for a channel metric, for example received signal strength or quality, of PRS(s). For example, if the signal strength or quality, measured for example by signal-to-interference-plus-noise ratio (SINR), reference signal received power (RSRP), or reference signal received quality (RSRQ), is above a threshold or between thresholds, the UE 110 may determine that the PRS has a particular trust level. The at least one criterion for determining the trust level for PRS(s) may be included in the positioning assistance data. Based on the determined trust level, the UE 110 may determine the corresponding quantization level for PM parameter(s) indicated in the positioning assistance data. For example, if a PRS is received in very noisy conditions, then the measurements have inherently low trust (accuracy), and the UE 110 may reduce the size of the PM report, e.g. by quantizing it more, and thereby save on latency. Conversely, for a measurement deemed to be very accurate by the UE 110 (high trust level), the UE 110 may prioritize the measurement quality, and use no or very limited quantization at the expense of latency. A variable number of quantization bits, proportional to a trust level of the UE report, may be therefore configured and some PM reports may be quantized more than others.

Alternatively, or additionally, the different quantization levels may be associated with different TRPs. For example, the UE 110 may be requested to use a first quantization level (e.g. number of quantization bits) for PRS(s) received from a first TRP and a second quantization level for PRS(s) received from a second TRP. In general, different quantization levels may be configured for a plurality of TRPs.

Alternatively, or additionally, the different quantization levels may be associated with respective PM parameters. For example, the UE 110 may be requested to use a first quantization level for a first PM parameter, e.g. TOA, and a second quantization level for a second PM parameter, e.g. AOA. In general, different quantization levels may be configured for a plurality of PM parameters.

An example of TRP and PM parameter specific configuration is provided in the following table:

| TRP ID | PRS configuration | UE-report quantization level |
|---|---|---|
| Id of the target TRP | Code generation Time-frequency-space allocation Etc. | OTDOA-quantization level-1 RSRP-quantization-level-2 RTT-quantization level-3 RSTD-quantization level-4 Rx-Tx-time-difference-quantization level-5 ... Etc. |

Quantization levels of the different PM parameters (e.g. OTDOA, RSRP, RTT, RSTD, or Rx-Tx-time-difference) may be therefore separately assigned each TRP(s) identified by the TRP ID field. The LMF 132 may thereby instruct the UE 110 to apply a TRP-specific quantization for transmitting a PM report, for example according to LPP. The TRP-specific quantization may be for example indicated in an enhanced data assistance message. As in the above example, the LMF 132 may append to the TRP configuration list a field which describes the recommended or requested quantization level for each of the PM parameters. The quantization level may be given explicitly for example as a number of bits, as a Boolean indicator high/low (I/O), or as a level from a discrete set (e.g. {medium, low, high, . . . }. In such a scenario, the UE 110 may reply with an acknowledgement (ACK) per TRP or with an ACK applicable for the entire parameter set (for all TRPs), as will be further described below with reference to operation 405.

Alternatively, or additionally, the different quantization levels may be associated with respective carrier frequencies or carrier frequency ranges. Certain carrier frequencies may support more quantization than others. The quantization levels may be therefore defined on a per carrier and/or bandwidth part (BWP) level, instead, or in addition to, the TRP ID level. For example, the UE 110 may be requested to use a first quantization level for PRS(s) received on a first carrier frequency or frequency range and a second quantization level for PRS(s) received on a second carrier frequency or frequency range. In general, different quantization levels may be configured for a plurality of carrier frequencies or carrier frequency ranges.

As noted above, the minimum set of PM parameters, the number of PMs, and/or the PM resolution may be UE-specific. For example, some UEs may be required to report a more detailed PM for a higher number of beamed channels than other UEs at the same location. This enables the provision of PM data to be optimized for each UE individually. It is also noted that multiple sets of minimum PM parameters, multiple numbers of PMs, and/or multiple PM resolutions may be determined and indicated to the UE 110, for example corresponding to different circumstances or conditions.

According to an example embodiment, the positioning assistance data may comprise a list of alternative pairs of PM content and PM size. The list may therefore include different variants of the PM content and PM size. The list may be for example include a preferred variant and one or more feedback alternatives. An example of such list is provided below:

```
Preferred variant: {PM_content(1), PM_size(1)}
Fallback alternative 1: {PM_content(2), PM_size(2)}
...
Fallback alternative N: {PM_content(N−1)), PM_size(N−1)}
```

The list may therefore comprise a list of requested minimum PM content sets associated with respective PM sizes. For example, the list may include minimum sets of PM parameters associated with respective numbers of PMs. The positioning assistance data may further include an indication of a priority order for the minimum sets of PM parameters of the list. An example of the priority order is the labelling of the different variants as the preferred variant or fallback alternative 1 to N. The positioning assistance data may alternatively include an indication of a priority order for multiple positioning QoS requirements, for example latency and accuracy. This enables the UE 110 to determine by itself how to fulfil the QoS requirements.

At operation 403, the LMF 132 may transmit the positioning assistance data to the UE 110. Transmission of the positioning assistance data, as well as any communication between the UE 110 and the LMF 132 may be via a base station, such as for example the TRP 120 or the TRP 122. The positioning assistance data may comprise the information described above. For example, the positioning assistance data may comprise the indication of at least one minimum set of PM parameters, the indication of at least one minimum number of PM(s), and/or the indication of at least one level of resolution for reporting the positioning measurement data by the UE 110. The positioning assistance data may be transmitted in one or more control messages, for example a RequestLocationInformation message, as will be further described with reference to FIG. 5. The UE 110 may receive the positioning assistance data.

At operation 404, the UE 110 may determine whether requirement(s) of the positioning assistance data can be supported. This evaluation may be based on the UE quantization capabilities, power limitation (e.g. battery life), or the like. For example, the UE 110 may determine whether it has sufficient battery level to perform the minimum number of PMs indicated, or whether it has processing capabilities to perform quantization with the indicated level of resolution for the requested number of PMs.

At operation 405, the UE 110 may transmit an acknowledgement of the positioning assistance data to the LMF 132. The acknowledgement may be a positive acknowledgement (ACK), which may indicate that the UE 110 is able to provide a PM report in compliance with the received positioning assistance data, or a negative acknowledgement (NACK), which may indicate that the UE 110 is not able to provide a PM report in compliance with the received positioning assistance data. The acknowledgement may for example indicate that the UE 110 supports the minimum number of quantization bits indicated in the positioning assistance data. The negative acknowledgement may include an indication of PM content, PM size, and/or PM resolution supported by the UE 110. For example, the acknowledgement may indicate a minimum and/or maximum number of quantization bits supported by the UE 110. Furthermore, the UE 110 may transmit an indication of a supported type of resolution control, for example by corresponding flag(s) "Type-I-flag="0" and/or "Type-II-flag="1", if the UE 110 supports Type-II resolution control but not Type-I resolution control.

Similarly, the UE 110 may inform the LMF 132 of whether the preferred or alternative PM reporting is selected. This may be realized via another indicator, for example PM_report_type_index="(1)" or alternatively PM_report_type_index="(2)", which may refer to the index of the corresponding variant in the list of alternative pairs of PM content and PM size. The UE 110 may therefore transmit an indication of the minimum set of PM parameters and a respective number of PMs selected from the list by the UE 110. The LMF 132 may receive this indication, for example as part of the acknowledgement.

The acknowledgement may further comprise an indication of one or more TRPs, for example TRP ID(s), associated with the acknowledgement. For example, the UE 110 may indicate the TRP(s), for which the acknowledgement is valid. This means that the UE 110 is able to provide a PM report in compliance with the received positioning assistance data for the TRPs associated with the acknowledgement. Alternatively, the acknowledgement may comprise an indication that the acknowledgement applies to all TRPs. The UE 110 may further transmit an indication of one or more TRPs detected by the UE 110 to the LMF 132. Therefore, the acknowledgement may alternatively comprise an indication that the acknowledgement applies to the detected TRPs. Even though the ACK and NACK messages are provided as examples of possible replies to the received positioning assistance data, it is understood that similar information may be included in any reply or response message.

At operation 406, the LMF 132 and UE 110 may establish a positioning protocol session, for example an LPP session. During the session, positioning protocol data, for example PM reports, may be exchanged according to the positioning assistance data provided at operation 403 and/or the acknowledgement provided at operation 405.

The UE 110 may perform positioning measurements based on PRSs received from TRPs. The UE 110 may transmit PM data to the LMF 132 according to the position assistance data received at operation 403. The UE 110 may therefore transmit PM data according to the indicated PM content, PM size, and/or PM resolution. For example, the UE 110 may transmit the PM data according to the priority order of the positioning QoS requirements received from the LMF 132. If the required quantization level is TRP specific, the UE 110 may determine the quantization level for the indicated PM parameter(s) based on an identity of a TRP from which the PRS(s) are received. The PRS(s) may comprise an indication of the transmitting TRP. If the required quantization level is PM parameter specific, the UE 110 may determine the quantization level for the indicated PM parameter(s) based on the type of each parameter to be reported. If the required quantization level is carrier frequency (or range) specific, the UE 110 may determine the quantization level for the indicated PM parameter(s) based on the carrier frequency of the PRS. The PM data may comprise PM results associated with PRSs of multiple TRPs, thereby enabling the LMF 132 to determine the position of the UE 110, for example based on multilateration.

The information indicated in the acknowledgement of the operation 405 may affect the configuration of the positioning protocol session and/or other operations associated therewith, for example determining the position of the UE 110. Depending on the content of the reply from the UE 110, the LMF 132 may continue the with the positioning protocol session as agreed (ACK received) or reconfigure the positioning protocol session (NACK received). Reconfiguration of the positioning protocol session may for example comprise triggering a pre-emptive recovery mechanism. For example, if the LMF 132 has requested: PM_report_type_index="(1)" with Type-I quantization but has received reply PM_report_type_index="(2)" with Type-II quantizabe for example the UE 110. Even though particular messages are used as examples, it is appreciated that similar signaling may be implemented with other type of messages. Communication between the server 530 and the target 510 may be routed via a base station, such as for example base station 120. The positioning assistance information may be included in one or more information elements (IEs) of the messages.

At operation 501, the server 530 may transmit a request for location information (RequestLocationInformation) to the target 510. The RequestLocationInformation message may comprise, for example in an IE of the message, one or more of the following parameters: a minimum number of quantization bits (minNQB) for PM parameter(s), a minimum number(s) of quantization bits associated with a particular trust level(s) of PRS(s) for PM parameter(s) (minNQB-trust-[level]), or accuracy threshold(s) for the different trust levels (accThreshold-dB).

In case of two trust levels (low/high), the IE may be formulated for example as follows. It is however noted that the IE may include one or more of the described parameters and not necessarily all of them.

```
-- ASN1START
Quantization-RequestLocationInformation ::= SEQUENCE {
    minNQB                 INTEGER (min-value-1..max-value-1),
    minNQB-trust-low       INTEGER (min-value-2..max-value-2),), OPTIONAL
    minNQB-trust-high      INTEGER (min-value-3..max-value-3),), OPTIONAL
    accThreshold-dB        INTEGER (min-value-4..max-value-4),), OPTIONAL
    ..}
-- ASN1STOP
``` tion, the LMF 132 may trigger an advanced positioning algorithm, e.g., use a memory-based UE tracking instead of the multilateration. Memory based UE-tracking may comprise considering also past positioning estimated when determining the current position of the UE 110. The current measurements and past position estimates may be combined for example using a Kalman filtering approach or a time series analysis approach. In general, the LMF 132 may select a positioning algorithm based on the acknowledgement, for example the indication of the minimum set of PM parameters and the respective number of PMs selected from the list by the UE 110, or, the indication of whether the UE 110 supports reporting the PM data according to the first and/or the second type of resolution control. Reconfiguring the positioning protocol session may also comprise transmitting updated positioning assistance data to the UE 110. Hence, at operation 407, the LMF 132 may return from operation 406 to operation 403 to update the positioning assistance data provided to the UE 110. The updated positioning assistance data may be determined based on the reply from the UE 110 such that the UE 110 is able to provide PM reports in compliance with the updated positioning assistance data.

The above procedure enables the LMF 132 to control the content and size of the PM reports sent by the UE 110. Therefore, the LMF 132 is also enabled to control the positioning protocol session such that several QoS requirements, for example latency and accuracy, may be fulfilled simultaneously.

FIG. 5 illustrates an example of communication between a server and a target device according to an enhanced positioning protocol, according to an example embodiment. The server 530 may be for example a network node implementing functionality of the LMF 132. The target 510 may The field descriptions of the IE (Quantization-Request-LocationInformation) may be as follows:

minNQB: This field may indicate the minimum number of quantization bits that the target 510 may use for PM report transmission.

minNQB-trust-low: This field may indicate the minimum number of quantization bits that the target 510 may use for PM report transmission when the target 510 has deemed the measurements as having low accuracy (low trust level). Low accuracy may be determined by the target 510 when the estimated SINR/RSRP/RSRQ/ other channel metric is below a threshold accThreshold-dB. If the latter field is empty, then the target may use a predetermined threshold, e.g. −6 dB. This field may indicate a fixed number of quantization bits.

minNQB-trust-high: This field may indicate the minimum number of quantization bits that the target 510 may use for PM report transmission when the target 510 has deemed the measurements as having high accuracy (high trust level). High accuracy may be determined by the target 510 when the estimated SINR/RSRP/RSRQ/ other channel is above the threshold accThreshold-dB. If the latter field is empty, then the target 510 may use a predetermined threshold, e.g. −6 dB.

accThreshold-dB: This field may indicate the accuracy threshold to be used by the target 510 to select between applying a low or high quantization, i.e. to select between minNQB-trust-high and minNQB-trust-low.

According to an example embodiment, the server 530 may transmit to the target 510, for example via the Quantization-RequestLocationInformation IE, instructions regarding multiple granularity levels of quantization. The multiple granularity levels may for example indicate very low, low, medium, high, or very high level of quantization.

The quantization level may be for example indicated by a number, for example a number in the interval [0,1], where 0 and 1 correspond to the minimum and maximum quantization levels, respectively. Lower level of quantization may refer to quantization with a relatively higher number of quantization bits (more accurate) and higher level of quantization may refer to quantization with a relatively lower number of quantization bits (less accurate). Alternatively, the quantization level may be indicated by the number of information bits to be used for each PM sample to be quantized. This enables generalization of the signaling of quantization levels such that the server 530 has flexibility to assign any level of quantization to the target 510, to enable optimal quantization for each case. For example, if the positioning latency and accuracy requirements are such that the optimal quantization level as calculated at the server 530 is between the lowest and highest quantization level, the use of multiple granularity levels enables the server 530 to capture this information and transfer it accordingly to the target 510.

At operation 502, the target 510 may provide location information to the server 530, for example in a ProvideLocationInformation message. The ProvideLocationInformation message may comprise the acknowledgement of the operation 405. The acknowledgement may be provided within an IE of the ProvideLocationInformation message. The IE may be formulated for example as follows. It is however noted that the IE may include one or more of the described parameters and not necessarily both of the parameters.

bility field may alternatively comprise a binary indication of whether the target 510 complies with the required number of quantization bits. In this case a separate acknowledgement field may not need to be provided. Feedback may be provided internally at the server 530 to update the Request-LocationInformation IE, in order to make it compatible with the supported capabilities indicated by the target 510 (cf. operation 407). Hence, the server 530 may update the RequestLocationInformation message based on the response form the target 510 such that at the next iteration of the ProvideLocationInformation message at operation 503, the compression loss is reduced, for example given the limitation (measurementLimit) of 100 octets. For example, the server may relax the PM constraints, e.g. allow for a finer resolution or larger PM size, compared with the previous request.

According to an example embodiment, the LMF 132 may receive an indication of TRP(s) detected by the UE 110 and configure at least one of the detected TRPs to transmit on-demand PRS(s). The LMF 132 may therefore provide the positioning assistance information (e.g. quantization information) to the UE 110 for the purpose of obtaining UE feedback for configuring on-demand PRS resources. This may be applied for example when the UE 110 provides measurement information to the LMF 132 with respect to the reference signals the UE 110 detects from the various available TRPs in the area. This information is used by the LMF 132 to identify which TRPs are detectable, and thus configure downlink PRS from those TRPs. This enables the PRS configuration of the communication network 100 to be

```
-- ASN1START
Quantization-ProvideCapabilities ::= SEQUENCE {
    acknowledgment                        BOOLEAN
    supported-quantization-capability     ENUMERATED {min-quantization-bits,
                                          max-quantization-bits} OPTIONAL

}
-- ASN1STOP
```

The field descriptions of the IE (Quantization-ProvideCapabilities) may be as follows:

acknowledgment: This field may indicate whether the target 510 can implement the requested quantization as per Quantization-RequestLocationInformation. TRUE may indicate that the target 510 accepts the request (ACK). FALSE may indicate that the target 510 does not accept the request (NACK).

supported-quantization-capability: This field may indicate the minimum and/or maximum quantization capability of the target 510. This can be expressed as yes/no (e.g. if there's no separate acknowledgement field) or explicitly as the number of quantization bits supported.

The acknowledgement may therefore comprise a binary flag (ACK/NACK). If a negative acknowledgment (NACK) is received, the server 530 may employ alternative means to reconstruct or retrieve the missing information. This may be realized by a server-specific implementation method. The server 530 may for example use the information from the NACK message to minimize the information loss. To enable this, the NACK message may not be a binary indication of (non-)acceptance but indicate the compression loss (the number of supported quantization bits). The supported-quantization-capability field may therefore comprise, e.g. in combination with the binary flag indicative of NACK, an indication of the number of quantization bits which the target 510 would support. The supported-quantization-capaadapted to current reception conditions of the UE 110. Given the possibly large number of detected TRPs, the UE 110 may be instructed to use quantized feedback to the network (LMF 132) for this purpose. The level of quantization to be used may be provided to the UE 110 by the LMF 132 before the UE 110 provides the feedback regarding the detected TRP(s) to the LMF 132. The level of quantization may depend on the QoS requirements of the associated positioning session as processed at the LMF 132.

Example embodiments of the present disclosure thus enable a network to control multiple simultaneously applicable QoS requirements, for example latency and positioning accuracy, for reporting positioning measurement results.

FIG. 6 illustrates an example of a method for requesting positioning measurement data, according to an example embodiment.

At 601, the method may comprise transmitting positioning assistance data, wherein the positioning assistance data comprises at least one of: an indication of at least one minimum set of positioning measurement parameters to be reported in positioning measurement data by a device; an indication of at least one minimum number of positioning measurements to be reported in the positioning measurement data by the device, or an indication of at least one level of resolution for reporting the positioning measurement data by the device.

FIG. 7 illustrates an example of providing positioning measurement data, according to an example embodiment.

At 701, the method may comprise receiving positioning assistance data, wherein the positioning assistance data comprises at least one of: an indication of at least one minimum set of positioning measurement parameters to be reported in positioning measurement data, an indication of at least one minimum number of positioning measurements to be reported in the positioning measurement data, or an indication of at least one level of resolution for reporting the positioning measurement data.

At 702, the method may comprise performing at least one positioning measurement based on at least one positioning reference signal.

At 703, the method may comprise transmitting positioning measurement data according to the positioning assistance data.

Further features of the methods directly result for example from the functionalities and parameters of the UE 110 or the LMF 132, as described in the appended claims and throughout the specification, and are therefore not repeated here. Different variations of the methods may be also applied, as described in connection with the various example embodiments.

An apparatus, for example the UE 110 or an apparatus configured with the LMF 132, may be configured to perform or cause performance of any aspect of the methods described herein. Further, a computer program may comprise instructions for causing, when executed, an apparatus to perform any aspect of the methods described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   at least one processor; and
   at least one memory including computer program code,
   the at least one memory and the computer code configured to, with the at least one processor, cause the apparatus at least to:
   transmit positioning assistance data to a device, wherein the positioning assistance data comprises:
   an indication of at least one level of resolution for reporting positioning measurement data by the device, the indication of the at least one level of resolution is associated with at least one of,
   a first type of resolution control and indicative of at least one quantization level for at least one of a minimum set of positioning measurement parameters, or
   second type of resolution control and indicative of a maximum amount of data for reporting a positioning measurement; and
   an acknowledgement to a request for location information, the acknowledgement comprising at least one of,
   an indication of whether the apparatus supports a minimum number of quantization bits, or
   an indication of an at least one of a minimum or maximum number of quantization bits supported by the apparatus.

2. The apparatus according to claim 1, further caused to:
determine a plurality of positioning quality-of-service requirements for the device, and determine, based on the plurality of positioning quality-of-service requirements, the at least one level of resolution.

3. The apparatus according to claim 2, further caused to:
transmit an indication of a priority order of the plurality of positioning quality-of-service requirements.

4. The apparatus according to claim 2, wherein the plurality of positioning quality-of-service requirements comprises at least one latency requirement and at least one accuracy requirement for the positioning measurement data.

5. The apparatus according to claim 1, wherein the positioning assistance data further comprises an at least one minimum set of positioning measurement parameters, wherein the at least one minimum set of positioning measurement parameters comprises at least one of: a time of arrival of at least one positioning reference signal, a time difference of arrival of at least one pair of positioning reference signals, an angle of arrival of the at least one positioning reference signal, a power level of the at least one positioning reference signal, or a power level of at least one multipath component of the at least one positioning reference signal.

6. The apparatus according to claim 1, wherein the at least one level of resolution comprises a plurality of quantization levels associated with a plurality of trust levels of an at least one positioning reference signal, wherein the positioning assistance data further comprises at least one criterion for determining a trust level of the at least one positioning reference signal.

7. An apparatus, comprising:
at least one processor; and
at least one memory including computer program code, the at least one memory and the computer code configured to, with the at least one processor, cause the apparatus at least to:
receive positioning assistance data, wherein the positioning assistance data comprises:
an indication of at least one level of resolution for reporting positioning measurement data, wherein the indication of the at least one level of resolution is associated with a first type of resolution control and indicative of at least one quantization level for at least one of a minimum set of positioning measurement parameters, or wherein the indication of the at least one level of resolution is associated with a second type of resolution control and indicative of a maximum amount of data for reporting a positioning measurement; and
an acknowledgement to a request for location information, the acknowledgement comprising an indication of whether the apparatus supports a minimum number of quantization bits or an indication of an at least one of a minimum or maximum number of quantization bits supported by the apparatus,
perform at least one positioning measurement based on at least one positioning reference signal, and
transmit positioning measurement data according to the positioning assistance data.

8. The apparatus according to claim 7, further caused to:
receive an indication of a priority order of a plurality of positioning quality-of-service requirements, and
transmit the positioning measurement data according to the priority order of the plurality of positioning quality-of-service requirements.

9. The apparatus according to claim 7, wherein the at least one level of resolution comprises a plurality of quantization levels are associated with a plurality of trust levels of the at least one positioning reference signal, wherein the positioning assistance data further comprises at least one criterion for determining a trust level of the at least one positioning reference signal, the apparatus further caused to:
determine a trust level of the at least one positioning reference signal based on the at least one criterion, and
determine a quantization level for at least one of the minimum set of positioning measurement parameters based on the determined trust level.

10. The apparatus according to claim 7, wherein the at least one level of resolution comprises a plurality of quantization levels associated with at least one of respective transmission-reception points, respective positioning measurement parameters, or respective carrier frequency ranges, the apparatus further caused to:
determine a quantization level for at least one of the minimum set of positioning measurement parameters based on an identity of a transmission-reception point from which the at least one positioning reference signal is received, a positioning measurement parameter to be reported, or a carrier frequency of the at least one positioning reference signal.

11. The apparatus according to claim 9, further caused to:
receive a request for location information comprising:
a minimum number of quantization bits for at least one of the minimum set of positioning measurement parameters, or
the plurality of quantization levels associated with the plurality of trust levels, wherein the at least one criterion comprises at least one threshold for a received signal strength or quality of the at least one positioning reference signal.

12. A method, comprising:
transmit positioning assistance data to an apparatus, wherein the positioning assistance data comprises:
an indication of at least one level of resolution for reporting positioning measurement data by the apparatus wherein the indication of the at least one level of resolution is associated with a first type of resolution control and indicative of at least one quantization level for at least one of a minimum set of positioning measurement parameters, or wherein the indication of the at least one level of resolution is associated with a second type of resolution control and indicative of a maximum amount of data for reporting a positioning measurement; and
an acknowledgement to a request for location information, the acknowledgement comprising an indication of whether the apparatus supports a minimum number of quantization bits or an indication of an at least one of a minimum or maximum number of quantization bits supported by the apparatus.

13. A method, comprising:
an apparatus receiving positioning assistance data, wherein the positioning assistance data comprises:
an indication of at least one level of resolution for reporting positioning measurement data wherein the indication of the at least one level of resolution is associated with a first type of resolution control and indicative of at least one quantization level for at least one of a minimum set of positioning measurement parameters, or wherein the indication of the at least one level of resolution is associated with a second type of resolution control and indicative of a maximum amount of data for reporting a positioning measurement; and an acknowledgement to a request for location information, the acknowledgement comprising an indication of whether the apparatus supports a minimum number of quantization bits or an indication of an at least one of a minimum or maximum number of quantization bits supported by the apparatus;

performing at least one positioning measurement based on at least one positioning reference signal; and transmit positioning measurement data according to the positioning assistance data.

* * * * *